July 24, 1956 R. SCHENK 2,756,106
FUEL INJECTION VALVE
Filed Nov. 10, 1954
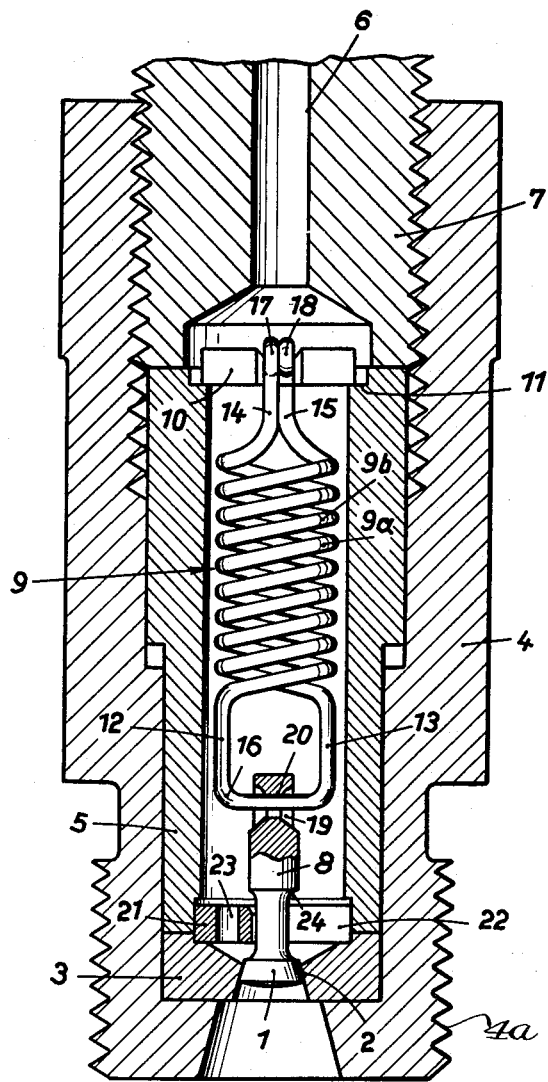
INVENTOR
RUDOLF SCHENK
BY Young, Emery & Thompson
ATTYS.

United States Patent Office 2,756,106
Patented July 24, 1956

2,756,106

FUEL INJECTION VALVE

Rudolf Schenk, Groetzingen, Germany

Application November 10, 1954, Serial No. 468,119

Claims priority, application Germany March 18, 1954

6 Claims. (Cl. 299—107.6)

The present invention relates to a fuel injection valve for internal combustion engines in which the valve cone provided in a housing opens toward the combustion chamber and is held by spring action in its closed position relative to the valve seat.

Prior to this invention, injection valves of this type have each been provided with a coil spring which at its lower end had an eye on which the valve shaft or an intermediate element with an articulated connection to the valve shaft is suspended so as to be held under tension. Such suspension of the valve shaft on a coil spring has the considerable advantage that the shaft may then be of very short length so that the weight to be moved will be small, a fact which is of great importance especially in high-speed engines in which the valve has to open and close very quickly and in quick succession. However, the coil springs generally applied in such valves have the disadvantage that the eyes thereof are formed by bending the ends of the spring, thus being open on one side, and that, if there is a considerable load acting on the point where the spring is bent to form the eye, it will have the tendency to bend open again with the result that the point of connection between the valve and the spring shifts toward one side of the spring and no longer coincides with the spring axis, so that the spring will then be subjected to uneven and unfavorable stresses. Such lateral shifting of the point of contact or load point is particularly unsuitable in fuel injection valves since the sudden changes in the load acting upon the spring and the continuous lateral shifting of the load point result in a wiggling movement and thus in transverse oscillations which are transmitted to the valve cone, thereby shifting the latter out of its proper axial direction. Consequently, the valve may at times close unevenly and improperly and the fuel jet will then be directed toward one side. Also, such transverse oscillations coupled with the uneven stresses acting upon the material of the spring increase the danger of breakage thereof. On the other hand, the use of a helical valve-closing spring of customary design which does not have the mentioned disadvantages requires the parts connected to, and movable with the valve cone to be of considerably larger mass, especially if the valve cone is to have an articulated suspension.

It is therefore the object of the present invention to design a coil spring especially adapted as a closing spring for fuel injection valves but for other purposes as well, in which a lateral shifting of the point of connecting or load point, as well as a lateral oscillatory movement of the spring caused by such lateral shifting must be avoided.

A principal feature of the invention resides in the application of two identical coil springs which are wound within each other in the same direction, the free ends thereof being bent at corresponding points in exactly opposite directions to each other and symmetrically to the spring axis. Such a spring has the advantage that the load acting thereon is evenly distributed over two generatrices of the twin coil spring which are diametrically opposed to each other so that a one-sided strain upon the spring, which leads to transversely directed forces and a shifting of the load point to an eccentric position relative to the spring axis, will thus be avoided.

Another object of the invention consists in winding the twin spring so that the two ends thereof used for suspending the valve stem form a single element or closed eye. This object is easily obtained by winding the double thread of the spring of a U-shaped piece of wire. The free opposite ends of the double spring are preferably bent outwardly so as to be parallel to the spring axis, and provided at their outer ends with bent-over hooks for suspending them in a suitable spring bearing which is preferably of rounded shape.

Further objects, features, and advantages of the present invention will appear from the following detailed description thereof and the accompanying drawing showing one embodiment of the invention which is a longitudinal section of the valve.

Referring to the drawing, the valve cone 1 cooperates with the conical valve seat 2 so as to close the valve opening tightly when drawn upwardly therein. Valve seat 2 is provided within a disk 3 mounted within the valve housing 4, which is provided with outer threads 4′ to be screwed into the cylinder of the engine. Disk 3 is secured within the housing 4 by a pressure sleeve 5 which is acted upon by a pressure element 7 having a valve inlet 6 and screwed into the valve housing 4. The valve cone 1 has a stem 8 projecting into the space within the sleeve 5 and suspended either directly or by means of an intermediate flexible element on a helical tension spring 9. Spring 9 is suspended at its upper end on a bearing 10 resting on a shoulder 11 at the upper end of the pressure sleeve 5. Thus, the tension spring 9 draws the valve cone 1 upon its seat 2, unless the injection pump produces in the valve housing a pressure sufficient to overcome the tension of the spring 9 to lift the valve cone 1 from its seat 2.

The tension spring 9 consists according to the invention of two helical threads of wire 9a and 9b wound within each other and being of equal thickness, equal coil diameter, equal pitch, and equal coiling direction. The wire ends 12, 13, and 14, 15, respectively, at opposite ends of the spring 9, are bent outwardly in opposite directions so as to lie within a plane intersected by the common axis of both coils 9a and 9b and also to extend symmetrically to such axis. The two wire ends 12 and 13 at the lower end of the spring are combined into a closed eye 16 simply by using a U-shaped spring wire to wind the double-threaded coil spring 9. The eye 16 has suspended thereon the valve cone 1 on its stem 8. The wire ends 14 and 15 at the upper end of the spring 9 are bent upwardly so as to lie parallel to the spring axis and equally spaced a very short distance therefrom. The free ends of these wires are bent in opposite directions so as to form hooks 17 and 18, on which the spring 9 is suspended on the spring bearing 10. At the point of contact with the two spring hooks 17 and 18, the spring bearing 10 is of reduced cross section and rounded surface so as to form an easily articulated suspension for the spring 9. For hooking the stem 8 of the valve 1 into the closed eye 16 of the spring, the stem is provided with a transverse bore 19 countersunk on both sides, so as to form an eye, preferably in such a manner that the supporting surface 20 then remaining is slightly rounded which, on the one hand, permits the valve 1 freely to adjust itself and, on the other hand, avoids a pointlike contact between the transverse eye 19 on the valve stem 8 and the closed eye 16. The eye 19 is brought into engagement with the closed eye 16 by threading it from one open spring end 17 or 18, over and along the coil windings until it assumes the central position on the closed eye 16 as shown in the drawing. In the particular embodiment shown, the shaft 8 of the valve 1 also passes through a radial slot 22 in a disk 21 which is fitted in a recess provided in the pressure sleeve 5 and the valve seat disk 3. The disk 21 acts as a stop for limiting the extent of the stroke of the valve 1, for which purpose the valve stem 8 has a recessed portion forming a shoulder 24 which on the downward or opening stroke of the valve 1 abuts against the upper edge of the disk 21. The fuel is able to pass freely to the valve seat 2 through the slot 22 as well as through an additional aperture 23 in the disk 21.

If desired, a flexible element may additionally be inserted between the valve stem 8 and the closed eye 16 of spring 9. This is, however, not required in the particular embodiment of the invention as illustrated since the spring 9, by its articulated suspension on the spring bearing 10, itself constitutes a flexible element which together with the suspension of the valve 1 by the spring eye 16 forms a universal joint.

While the invention has been described in detail with respect to a certain now preferred example and embodiment thereof, it will be understood by those skilled in the art that various changes and modifications may be made without departing from the spirit and scope of the invention as defined in the appended claims.

What I claim as new and desire to be secured by Letters Patent is:

1. A fuel injection valve for internal combustion engines comprising a valve housing having a fuel inlet, means for securing said housing to the cylinder of said engine, a valve seat near one end of said housing having an aperture communicating with said fuel inlet and a combustion chamber of said engine, a valve adapted to cooperate with said valve seat to open toward said combustion chamber when fuel is injected under pressure through said inlet into said housing, and a tension spring within said housing tending to retain said valve in its closed position, said spring comprising two coils of spring wire wound coaxially within each other in the same direction and each having free opposite ends, the corresponding ends of said two wires at opposite ends of said spring being bent symmetrically relative to the axis of said spring, and the two other ends of said wires being connected to said valve for suspending said valve under tension at the other end of said spring for closing the aperture in said valve seat.

2. A fuel injection valve for internal combustion engines comprising a valve housing having a fuel inlet, means for securing said housing to the cylinder of said engine, a valve seat near one end of said housing having an aperture communicating with said fuel inlet and a combustion chamber of said engine, a valve adapted to cooperate with said valve seat to open toward said combustion chamber when fuel is injected under pressure through said inlet into said housing, and a tension spring within said housing tending to retain said valve in its closed position, said spring comprising two coils of spring wire wound coaxially within each other in the same direction and each having free opposite ends, the corresponding ends of said two wires at opposite ends of said spring being bent symmetrically relative to the axis of said spring, the two ends of said wires at one end of said spring being connected to said housing for suspending said spring therein, the two other ends of said wires together forming a closed eye, and said valve flexibly interengaging with said eye for flexibly connecting said valve under tension to said valve for closing the aperture in said valve seat.

3. A fuel injection valve for internal combustion engines comprising a valve housing having a fuel inlet, means for securing said housing to the cylinder of said engine, a valve seat near one end of said housing having an aperture communicating with said fuel inlet and a combustion chamber of said engine, a valve adapted to cooperate with said valve seat to open toward said combustion chamber when fuel is injected under pressure through said inlet into said housing, a tension spring within said housing tending to retain said valve in its closed position, said spring comprising two coils of spring wire wound coaxially within each other in the same direction and each having free opposite ends, the corresponding ends of said two wires at opposite ends of said spring being bent symmetrically relative to the axis of said spring, the two ends of said wires at one end of said spring extending parallel to the axis of said spring and forming hooks, and a spring bearing in said housing, said hooks being flexibly suspended on said spring bearing, the two other ends of said wires together forming a closed eye, and said valve flexibly interengaging with said eye for flexibly connecting said valve under tension to said valve for closing the aperture in said valve seat.

4. A fuel injection valve for internal combustion engines comprising a valve housing having a fuel inlet, means for securing said housing to a cylinder of said engine, a valve seat near one end of said housing having an aperture communicating with said fuel inlet and a combustion chamber of said engine, a valve adapted to cooperate with said valve seat to open toward said combustion chamber when fuel is injected under pressure through said inlet into said housing, a tension spring within said housing tending to retain said valve in its closed position, said spring formed of a single U-shaped piece of spring wire, the two free ends of said wire being wound together in the same direction so as to form two coaxial coils wound within each other and having the same pitch and the same length joined at one end by a U-shaped eye, said valve having a transverse aperture threaded into said eye for flexibly suspending said valve on said spring, the two free ends of said spring extending parallel to the axis of said spring and at a substantially equal distance therefrom, and forming hooks, and a spring bearing in said housing, said hooks being flexibly suspended on said spring bearing.

5. A fuel injection valve for internal combustion engines comprising a substantially socketlike valve housing having a lower bottom with a fuel outlet therein, means on said housing for securing the same to a cylinder of said engine, a disklike valve seat having a conical opening therein mounted within said housing with its lower surface resting on the bottom thereof, said conical opening adapted to communicate with a combustion chamber of said engine and widening in the direction of said chamber, a tubular element within said housing and abutting against the upper surface of said valve seat, a pressure element threadedly mounted in the upper end of said housing for pressing said tubular element upon said valve seat, said pressure element having a fuel inlet communicating through the central openings in said tubular and pressure elements with the conical opening in said valve seat, a spring bearing mounted near the upper end of said tubular element, a tension spring flexibly suspended on said bearing within said tubular element and coaxially therewith, said spring being formed of a single U-shaped piece of spring wire having a substantially horizontal connecting portion, the two free ends of said wire being wound together in the same direction so as to form coaxial coils wound within each other and having the same pitch and the same length joined at the lower end by a U-shaped eye, the two free upper ends of said spring extending parallel to the axis of said spring at a substantially equal distance therefrom and closely adjacent each other, said two free upper ends forming hooks which are flexibly suspended on said spring bearing, a valve having a cone adapted to cooperate with said valve seat to open toward said combustion chamber when fuel is injected under pressure through said inlet into said tubular element, said valve having a stem extending into said tubular element and having a shoulder thereon and a transverse aperture above said shoulder, said transverse aperture receiving said U-shaped eye and said spring, said valve stem being flexibly suspended on said horizontal connecting portion, the flexible suspension of said hooks on said spring bearing and of said valve on said horizontal connecting portion being shaped and disposed relative to each other so as to form a universal joint for said valve, said spring being under tension and tending to retain said valve in a closed position, and a member intermediate said valve seat and said tubular element and having a shoulder thereon adapted to engage with the shoulder on said valve stem for limiting the opening stroke of said valve.

6. A fuel injection valve for internal combustion engines comprising a substantially socket-like valve housing having a lower bottom with a fuel outlet therein, means on said housing for securing the same to a cylinder of said engine, a disk-like valve seat having a conical opening therein mounted within said housing with its lower surface resting on the bottom thereof, said conical opening adapted to communicate with a combustion chamber of said engine and widening in the direction of said chamber, a tubular element within said housing and abutting against the upper surface of said valve seat, a pressure element threadedly mounted in the upper end of said housing for pressing said tubular element upon said valve seat, said pressure element having a fuel inlet communicating through the central openings in said tubular and pressure elements with the conical opening in said valve seat, a spring bearing mounted near the upper end of said tubular element, a tension spring flexibly suspended on said bearing within said tubular element and coaxially therewith, said spring being formed of a single U-shaped piece of spring wire having a substantially horizontal connecting portion, the two free ends of said wire being wound together in the same direction so as to form coaxial coils wound within each other and having the same pitch and the same length joined at the lower end by a U-shaped eye, the two free upper ends of said spring extending parallel to the axis of said spring at a substantially equal distance therefrom and closely adjacent each other, said two free upper ends forming hooks which are flexibly suspended on said spring bearing, and a valve having a cone adapted to cooperate with said valve seat to open toward said combustion chamber when fuel is injected under pressure through said inlet into said tubular element, said valve having a stem extending into said tubular element and having a shoulder thereon and a transverse aperture above said shoulder, said transverse aperture receiving said U-shaped eye on said spring, said valve stem being flexibly suspended on said horizontal connecting portion, the flexible suspension of said hooks on said spring bearing and of said valve on said horizontal connecting portion being shaped and disposed relative to each other so as to form a universal joint for said valve, and said spring being under tension and tending to retain said valve in a closed position.

References Cited in the file of this patent

UNITED STATES PATENTS

| | | |
|---|---|---|
| 1,302,079 | O'Connor | Apr. 29, 1919 |
| 1,893,457 | Tartrais | Jan. 3, 1933 |
| 2,443,309 | Dzus | June 15, 1948 |

FOREIGN PATENTS

| | | |
|---|---|---|
| 367,014 | Great Britain | Feb. 12, 1932 |
| 909,177 | France | Dec. 10, 1945 |